(12) United States Patent
Yu et al.

(10) Patent No.: US 7,437,685 B2
(45) Date of Patent: Oct. 14, 2008

(54) LOGICAL, SAFE, AND MORE PERSONAL USER INTERFACE FOR ACCESSING DATA AND LAUNCHING PROGRAMS OR APPLICATIONS

(75) Inventors: Shuling Yu, Sammamish, WA (US); Zhiqiang Mu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 10/383,692

(22) Filed: Mar. 10, 2003

(65) Prior Publication Data

US 2004/0179033 A1 Sep. 16, 2004

(51) Int. Cl.
G06F 3/00 (2006.01)
G06F 3/14 (2006.01)
G06F 13/00 (2006.01)
G06F 3/048 (2006.01)

(52) U.S. Cl. .................... 715/853; 715/841; 715/828; 715/844

(58) Field of Classification Search ................. 715/853, 715/841, 828, 844
See application file for complete search history.

(56) References Cited

U.S. PATENT DOCUMENTS

| | | | |
|---|---|---|---|
| 5,550,967 A | | 8/1996 | Brewer et al. |
| 5,596,699 A | * | 1/1997 | Driskell ...................... 715/834 |
| 5,644,344 A | * | 7/1997 | Haselby ...................... 347/19 |
| 5,680,617 A | | 10/1997 | Gough et al. |
| 5,687,334 A | | 11/1997 | Davis et al. |
| 5,877,746 A | | 3/1999 | Parks et al. |
| 6,005,566 A | | 12/1999 | Jones et al. |
| 6,035,330 A | * | 3/2000 | Astiz et al. .................. 709/218 |
| 6,188,399 B1 | | 2/2001 | Voas et al. |
| 6,252,597 B1 | * | 6/2001 | Lokuge ...................... 715/841 |
| 6,990,638 B2 | * | 1/2006 | Barksdale et al. ........... 715/853 |
| 2003/0007010 A1 | * | 1/2003 | Ullmann et al. ............. 345/810 |
| 2003/0081013 A1 | * | 5/2003 | Allen et al. .................. 345/853 |
| 2003/0142145 A1 | * | 7/2003 | Bennett et al. .............. 345/853 |

OTHER PUBLICATIONS

Screenshot from PC Operating Microsoft Windows® Professional Version 5.0 2195.
http://www.pcmag.com/article2/0,4149,572080,00.asp printed Feb. 4, 2003.

(Continued)

Primary Examiner—William L. Bashore
Assistant Examiner—Jordany Nunez
(74) Attorney, Agent, or Firm—Birch, Stewart, Kolasch & Birch, LLP

(57) ABSTRACT

Logical, safe, personalizable, and user friendly computer user interfaces may include: (a) plural branches; (b) plural sub-branches associated with the branches; and (c) an interface control that includes: a branch locking interface, a sub-branch locking interface, a branch display control interface, and/or a sub-branch display control interface. Optionally or alternatively, user interfaces may include: (a) a first section including plural items having a first common visual characteristic; and (b) a second section including plural items having a second common visual characteristic. In this manner, the common visual characteristics may indicate an association between the items sharing the characteristic. This associative visual characteristic aspect may be applied to the branched user interface structure described above, for example, by commonly coloring at least some portions of a branch and its associated sub-branches while commonly coloring at least some portions of another branch and its associated sub-branches in a different color.

30 Claims, 11 Drawing Sheets

OTHER PUBLICATIONS http://www.microsoft.com/windowsxp/pro/using/howto/customize/overview/startmenu.asp printed Feb. 4, 2003.

http://www.microsoft.com/enable/training/windowsxp/customizestartmenu.htm printed Feb. 4, 2003.

* cited by examiner

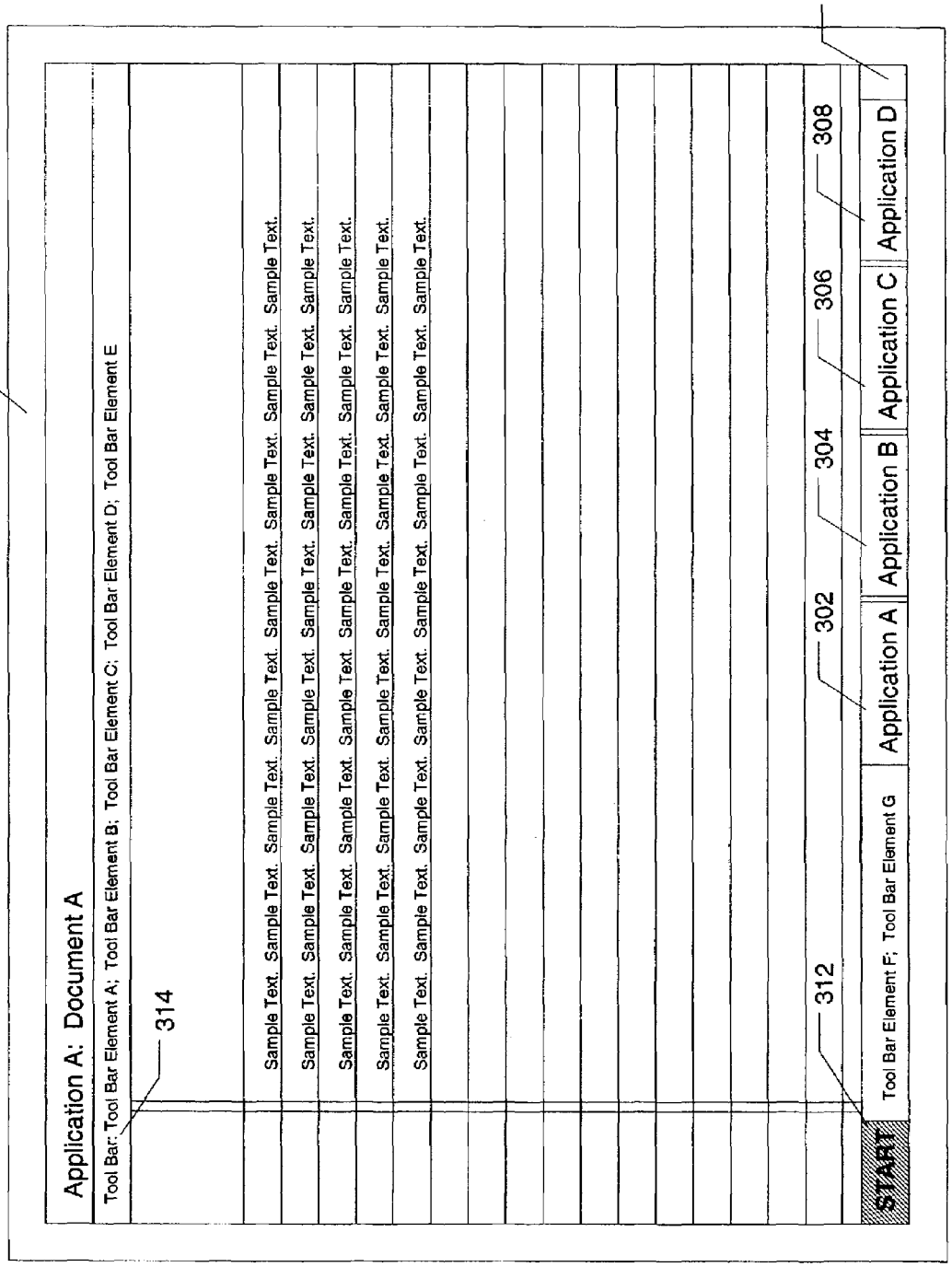

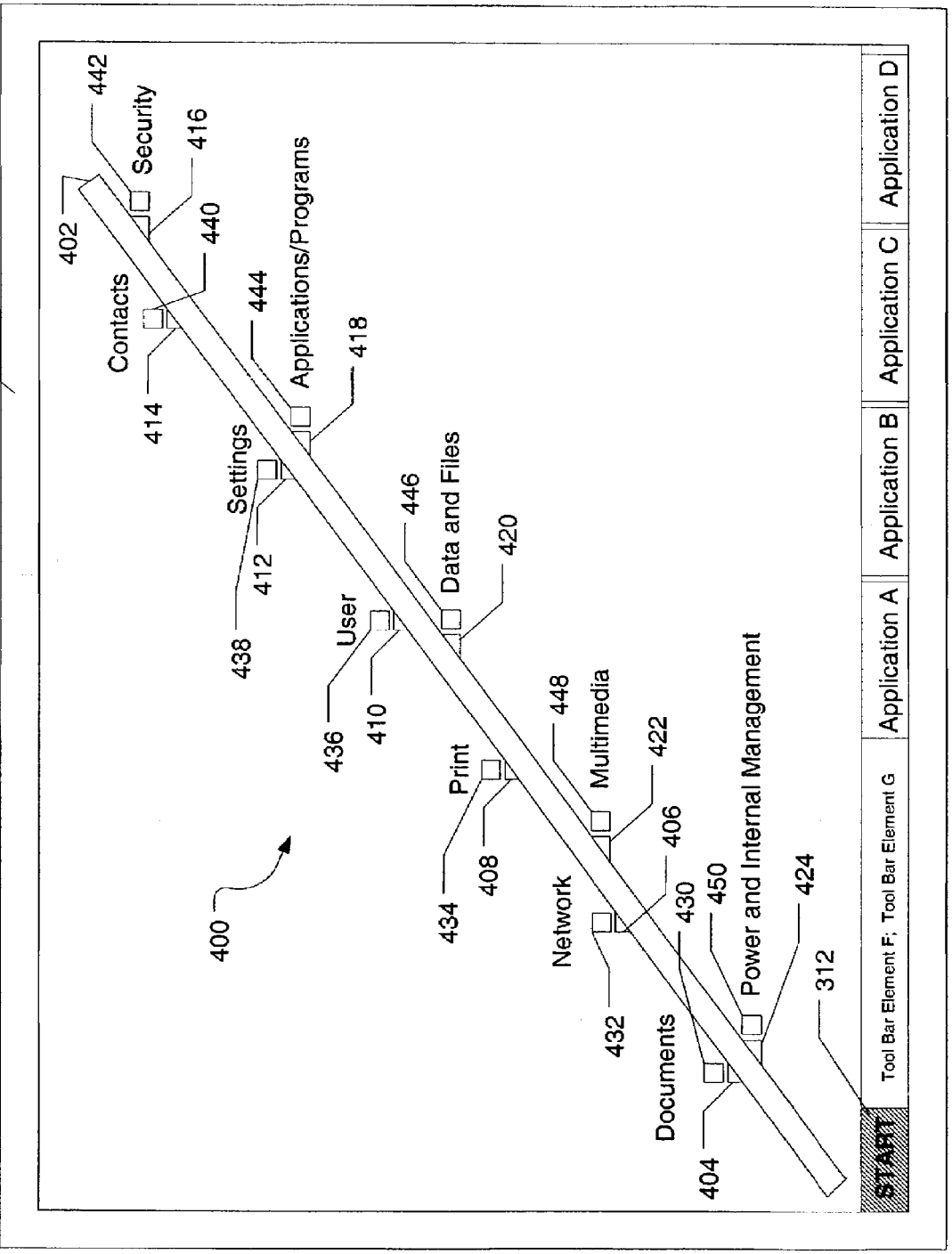

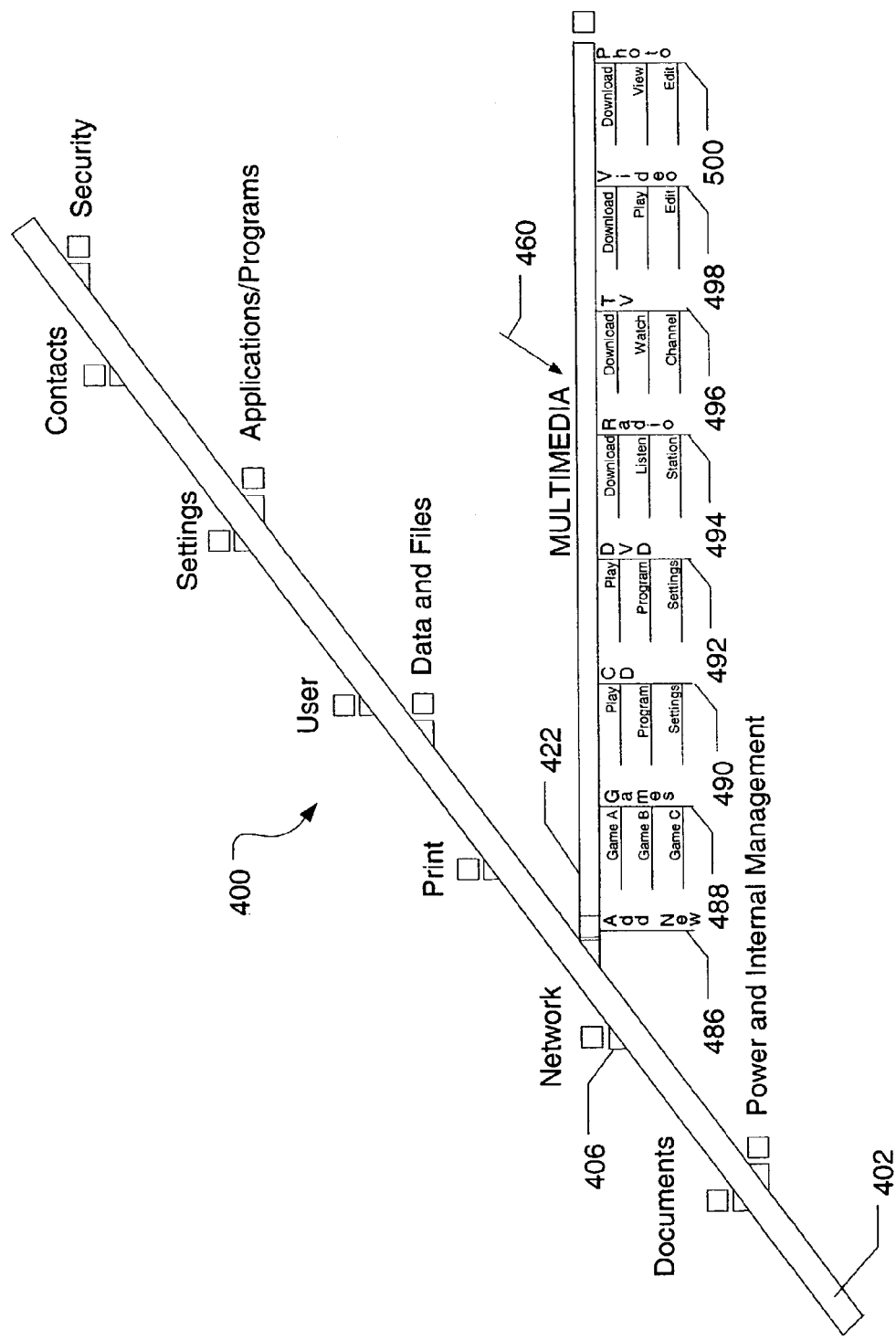

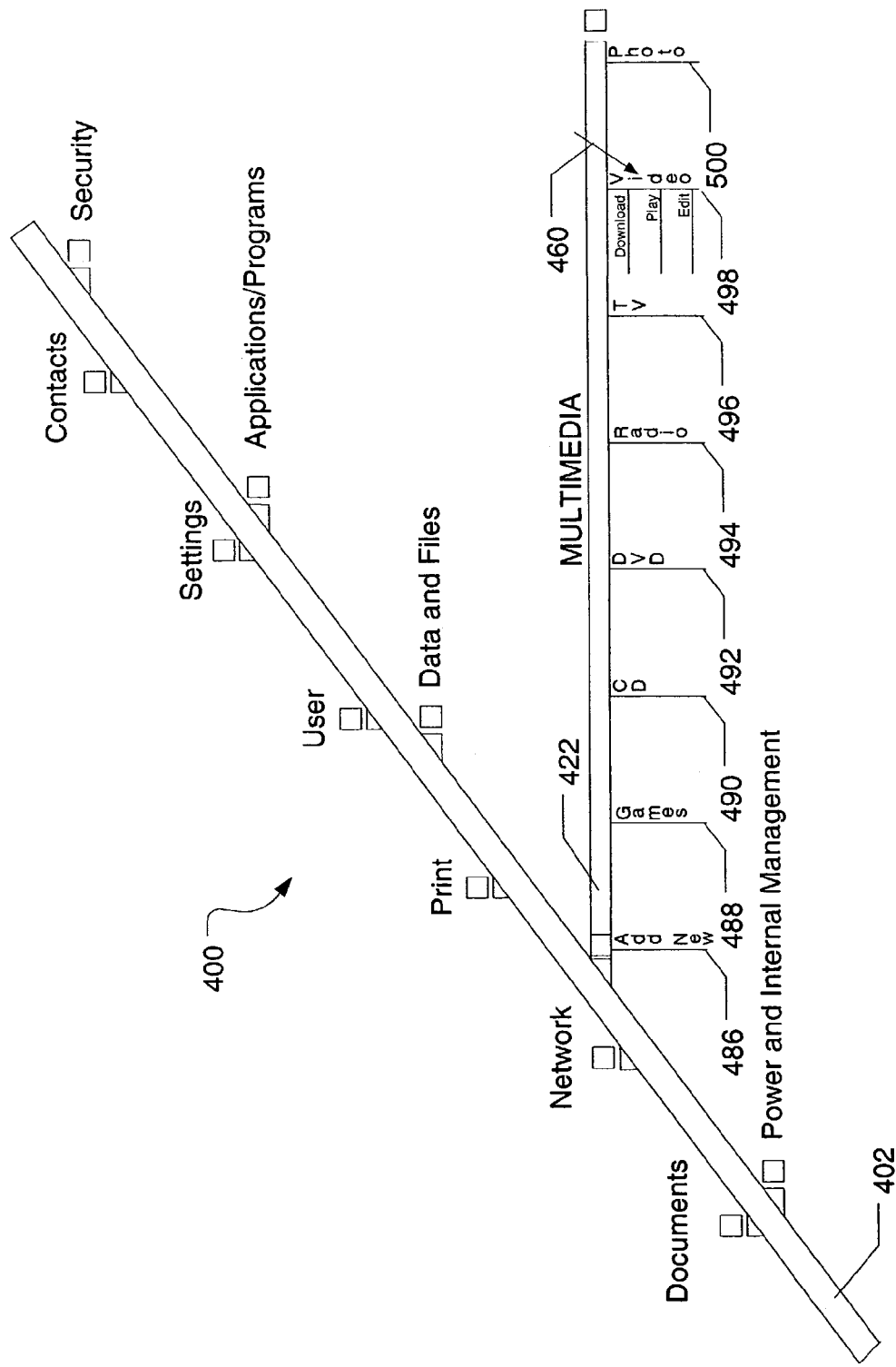

LOGICAL, SAFE, AND MORE PERSONAL USER INTERFACE FOR ACCESSING DATA AND LAUNCHING PROGRAMS OR APPLICATIONS

FIELD OF THE INVENTION

The present invention relates generally to systems, methods, and computer-readable media that provide user interfaces for selecting and launching computer programs or functions (including application programs) and/or otherwise gaining access to computer data. These user interfaces, in at least some examples of the invention, may be used as start menus or desktop menus. The user interfaces are logical, safer, and more easily personalized to a specific user's tastes as compared to conventional start menus or desktop menus.

BACKGROUND

Conventional start menus and desktop menus assist computer users by providing access to a great amount of data and/or access to numerous computer programs and/or computer functions. Such start menus and desktop menus provide useful collections of information that allow convenient access to data and/or computer programs or other computer functions.

In some examples, however, conventional start menus tend to initially display only broad, general categories of information, such as "Programs," "Documents," "Settings," "Search," and the like. More specific items of information, the items that actually allow access to the desired data and/or computer programs or functions, typically tend to be buried within the menu such that it may require several mouse clicks or other user actions to locate the desired items. While this buried structure may be adequate for some users, conventional start menus can be difficult for some users to use. For example, users inexperienced with the operating system or computers in general can have difficulty locating a desired item on a conventional start menu. Additionally, users attempting to locate newly acquired data and/or attempting to activate computer programs or functions not previously used or infrequently used can have difficulty locating the desired items in the buried start menu structure.

Because of the large number of functions, programs, and data present and accessible using typical computers, some type of buried structure for the start menu is probably inevitable. At present, however, these menus have rather limited "customizability," or can be customized only with some advanced knowledge of the system and its use. The inability for users to easily customize or personalize a start menu to suit their tastes and needs can further limit the user's ability to locate desired programs, functions, and data using the computer.

Conventional desktop menus, on the other hand, typically have no easy access structure. Rather, these desktop menus typically include a number of independent icons placed on a screen in a random or selected manner. No grouping of icons into associated sets typically occurs, unless the user goes to great lengths to do so. These features of conventional desktop menus also can make it difficult for some users to locate desired programs, functions, or data using the computer.

Other features of computer systems also can be difficult for some users to locate or access. For example, parents with small children may wish to block or control their children's access to certain information available on the computer (e.g., internet access, financial information, business information, etc.). In some instances, it can be difficult or impossible for users to determine how to limit or control access to certain data, programs, or functions accessible through the computer.

Accordingly, it would be advantageous to provide a user interface, such as a start menu or desktop menu, that allows easy access to stored data and/or computer programs or functions, while also giving users the ability to easily control access to the data, programs, and functions. Additionally, it would be advantageous to provide a user interface that is easily customizable by the user, to enable ready display of some information and hiding of other information, while still allowing easy user access to the hidden information, if it is desired.

SUMMARY

Aspects of the present invention relate to systems and methods for providing user interfaces on display devices. The user interfaces provided according to at least some examples of the invention include: (a) a plurality of branches that appear automatically upon activation of the user interface or in response to user action; (b) a plurality of sub-branches associated with one of the branches, wherein the sub-branches appear automatically upon appearance of their associated branch or in response to user action; and (c) an interface control including: a branch locking interface, a sub-branch locking interface, a branch display control interface, and/or a sub-branch display control interface. As an alternative or an option, user interfaces provided according to at least some examples of the invention may include: (a) a first section that appears automatically upon activation of the user interface or in response to user action, wherein the first section includes plural items, and all items in the first section have a first common visual characteristic; and (b) a second section that appears automatically upon activation of the user interface or in response to user action, wherein the second section includes plural items, and all items in the second section have a second common visual characteristic that differs from the first common visual characteristic. These items in the various sections may allow user access to stored data and/or user activation of computer programs and/or computer functions. Additional aspects of the present invention relate to display devices including user interfaces according to examples of the invention displayed thereon. Still additional aspects of the present invention relate to computer-readable media including computer-executable instructions stored thereon for providing user interfaces according to examples of the invention.

Additionally, aspects of the present invention relate to computer-readable media having stored thereon a data structure useful in rendering an item in a user interface that depicts plural items in a branched structure of one or more grouped items. The data structure according to some examples of this aspect of the invention may include: a first data field containing data representing a location of the item in the branched structure; a second data field containing data representing an execution path to allow user access to data represented by the item or user activation of a computer program or a computer function represented by the item; and a third data field containing data representing access rights to the data represented by the item. The data structure optionally may include a fourth data field containing data indicating whether the item is to be displayed automatically upon activating the user interface or its parent branch and/or a fifth data field containing data representing a visual characteristic (such as color) associated with the item when rendered in the user interface.

BRIEF DESCRIPTION OF THE DRAWINGS

The above and other objects, features, and advantages of the present invention will be readily apparent and fully understood from the following detailed description, taken in connection with the appended drawings, which include:

FIG. 1 illustrates an example of a display device through which a user interface according to examples of this invention may be used;

FIG. 2 illustrates an example of a display provided when one example of a user interface according to this invention is activated;

FIGS. 3*a* through 6 illustrate various features and options that may be provided in some examples of user interfaces according to this invention;

DETAILED DESCRIPTION

Figure 3A:
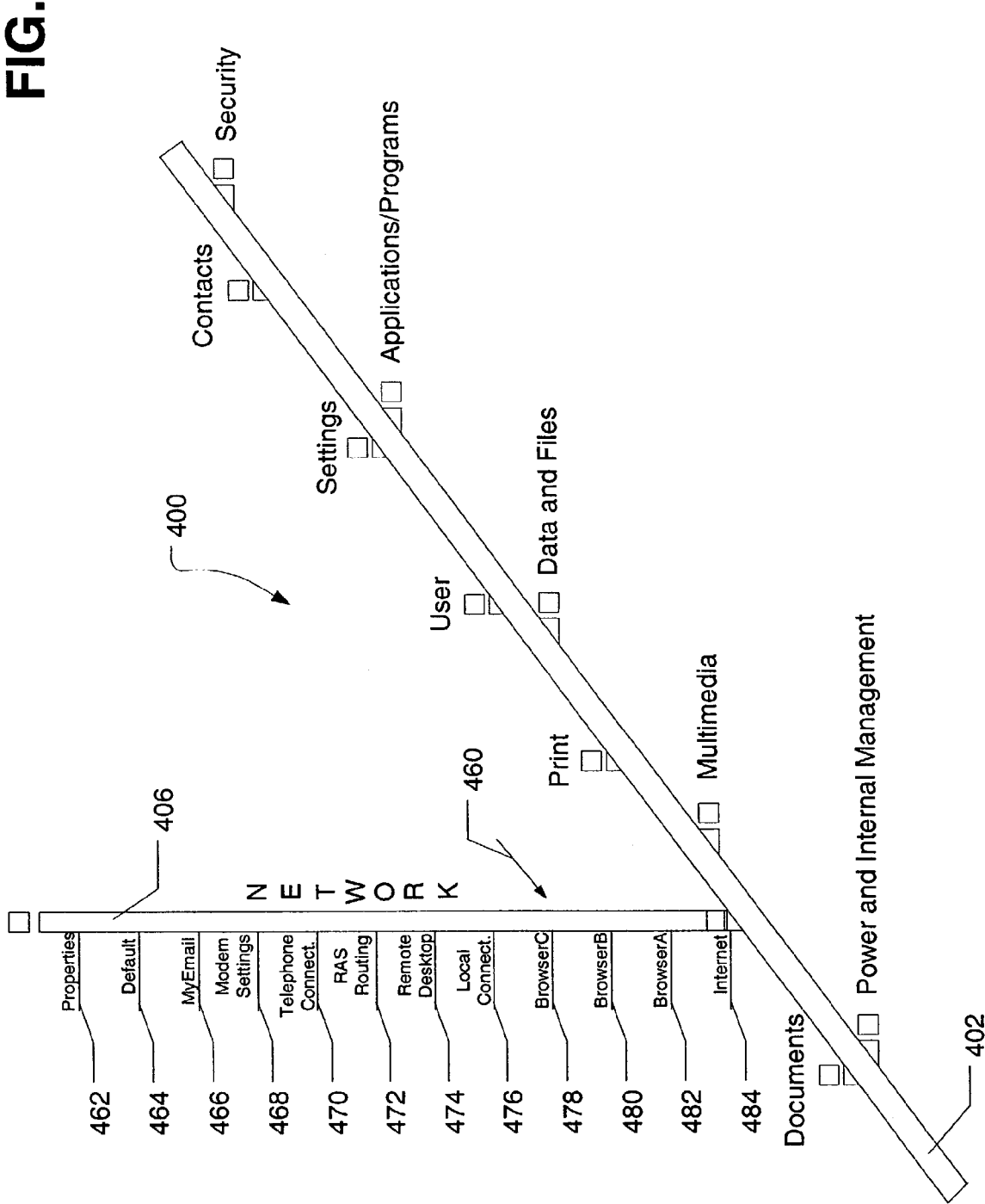

The following terms used in this specification have the meanings described below:

"Hover" or "hover action"—Locating a pointing device or a pointing indicator proximate to an element on a user interface without selecting the element. User input devices (such as mice, trackballs, styli, pens, touch pads, and the like) may be used to change the location of the pointing device or indicator. A "hover action" may be accomplished, for example, by holding and/or moving a pointing device or indicator associated with a mouse or trackball without clicking the mouse or trackball buttons, holding and/or moving a stylus or pen slightly above a digitizer screen without touching the screen (e.g., in a stylus or pen-based computing system), holding and/or moving a pointing device or indicator using a finger, e.g., on a touch pad, or in any other suitable manner.

Element—A part or portion of a user interface. An "element" generically covers the various things that may appear on a user interface, and it includes, but is not necessarily limited to: branches, sub-branches, sub-sub-branches, sections, interface control elements, items, toolbars, icons, soft buttons, etc.

"Interface control"—An element appearing on a user interface that, in some manner, allows control over an aspect of the user interface. Interface controls include, but are not necessarily limited to: branch display control interfaces, sub-branch display control interfaces, sub-sub-branch display control interfaces, branch lock interfaces, sub-branch lock interfaces, sub-sub-branch lock interfaces, and the like.

"Item"—An element appearing on a user interface through which a user can access one or more predetermined data sets and/or activate one or more computer programs or functions.

"Section"—An element appearing in a user interface containing or allowing access to a subset of the items contained in the user interface. All items in a "section," in at least some examples of the invention, may have a common visual characteristic.

"Common Visual Characteristic"—Any common visual attribute that ties or associates elements of a user interface together. A "common visual characteristic" may include a common color or color scheme; common text font; common text font size; common text highlighting, bolding, and italicizing attributes; and the like.

"Render"—The process of determining how information will be displayed, whether on a screen, printed, or output in a different manner.

I. GENERAL DESCRIPTION OF EXAMPLES OF THE INVENTION

As described above, the present invention relates generally to systems, methods, and computer-readable media that provide user interfaces for selecting and launching computer programs or applications and/or otherwise gaining access to computer data. One more specific aspect of this invention relates to display devices having user interfaces rendered thereon from which plural sets of stored data can be accessed or from which plural computer programs or computer functions can be activated. User interfaces according to at least some examples of the invention may include: (a) a plurality of branches that appear either automatically upon activation of the user interface or in response to user action; (b) a plurality of sub-branches associated with one of the plurality of branches, wherein the sub-branches appear either automatically upon appearance of their associated branch or in response to user action; and (c) an interface control including at least one member selected from the group of: a branch locking interface, a sub-branch locking interface, a branch display control interface, and a sub-branch display control interface. The interface control also may appear automatically when a parent branch or sub-branch appears or in response to user action. Sets of stored data may be accessed and/or computer programs or functions may be activated through the user interface, e.g., directly or indirectly through items included in the branches and/or sub-branches.

The branch locking interface present in some examples of the invention may be used, for example, to control access to or use of all sub-branches associated with the branch. Similarly, the sub-branch locking interface included in some examples of the invention may be used, for example, to control access to or use of data or programs associated with that sub-branch. The branch display control interface present in some examples of the invention may be used, for example, to control whether the associated branch will be displayed automatically upon activation of the user interface (e.g., like a branch display "on/off" switch). Similarly, the sub-branch display control interface present in some examples of the invention may be used, for example, to control whether the associated sub-branch will be displayed automatically upon display of its associated branch.

Aspects of this invention also relate to methods of providing user interfaces on display devices by rendering the branches, sub-branches, and interface control as described above. Also, aspects of the invention relate to computer-readable media that include computer-executable instructions stored thereon for performing the various methods according to the invention.

Additional aspects of the invention relate to display devices having user interfaces rendered thereon from which plural sets of stored data can be accessed and/or from which plural computer programs or computer functions can be activated. User interfaces according to at least some examples of this aspect of the invention may include: a first section that appears either automatically upon activation of the user interface or in response to user action and a second section that appears either automatically upon activation of the user interface or in response to user action. Each section includes plural items that allow access to one or more sets of stored data and/or activation of computer programs or computer functions. In these examples of user interfaces according to the invention, common visual characteristics exist to help the user identify associated items in the user interface. For example, all items in the first section may be rendered having a first common visual characteristic, and all items in the second section may be rendered having a second common visual characteristic that distinguishes items in the second section from items in the first section. Various common visual characteristics may be used to associate items in the sections without departing from the invention. For example, the sections could be color-coded such that the first section has one color associated with it and the second section has a different color associated with it. Additional aspects of the invention relate to methods of displaying user interfaces of this type by rendering the sections as described above on a display device and to computer-readable media including computer-executable instructions stored thereon for performing the methods as described above.

The common visual characteristic aspects of the invention also may be applied to user interfaces that include the branched structure described above. For example, a branch and its associated sub-branches may be rendered in one color (or in a font of one color), while another branch and its associated sub-branches may be rendered in a different color (or in a font of a different color).

When two or more elements in user interfaces according to the invention are said to be of the same "color" in this specification (e.g., a "first color" or a "second color"), this does not require an exact color match. For example, a branch may be rendered in a color (e.g., red) and its associated sub-branches may be rendered in the exact same red color or, alternatively, in one or more different shades of red. Minor differences in color shade are to be construed as being the "same color" and as having a "common visual characteristic," as those terms are used in this specification.

Additionally, the common visual characteristic aspects of user interfaces according to some examples of the invention do not require exactly the same features or portions of a section to have exactly the same characteristics. For example, a branch on a user interface according to the invention may be rendered in one color while its associated sub-branches may include textual information in that color font (or vice versa). As another example, a branch on a user interface according to the invention may be rendered as a solid color while its associated sub-branches may be rendered with cross-hatching in that color (or vice versa). As still another example, all textual information contained in a branch and its associated sub-branches may be of the same color. Many variations in the common visual characteristic aspects of the invention are possible.

Given this general description of various aspects of user interfaces according to examples of the invention, specific example user interfaces will now be described in more detail conjunction with FIGS. 1-6.

II. DETAILED DESCRIPTION OF EXAMPLES OF THE INVENTION

FIG. 1 illustrates an example of a display 300 as it may appear when running a computer program on a computer coupled to the display 300. The running program may be any type of program that is loaded on or accessible through the computer without departing from the invention. As illustrated, the computer may have numerous programs open and running at a time, as evidenced by the various application programs 302, 304, 306, and 308 identified on tool bar 310. Tool bars of this type are conventional and known to those in the art, and they may include any other desired or available information without departing from the invention.

The display 300 includes a soft button 312 from which some examples of user interfaces according to the present invention may be activated or accessed. Of course, button 312 may be located anywhere in the user interface and/or user interfaces according to this invention may be accessed or initially displayed in any suitable manner without departing from the invention. For example, while the button 312 is always present in the example shown in FIG. 1, this is not a requirement. The button 312 could automatically appear, for example, whenever the user performs a hover action near the location of the button 312 or the tool bar 310 in which it may be located. As another example, the button 312 could be accessed through a tool bar element, such as through a tool bar element provided on tool bar 310 or tool bar 314 and/or through a user input device (e.g., by a "right click" action). As still another example, the user interface could be launched from a hard wired button provided on the computer, a keyboard, a mouse, and/or other input devices.

A. The Branched Structure

One aspect of this invention relates to user interfaces having a branched structure from which data can be accessed and/or computer programs or computer functions can be activated. The following describes various examples of user interfaces that relate to this aspect of the invention.

When the user interface is activated in this example (e.g., using button 312 in FIG. 1), a user interface 400 appears on the display 300, as shown in FIG. 2. The user interface 400 according to this illustrated example of the invention has a branched structure. The branched structure includes a base member 402 and a plurality of branches that extend from the base member 402. While any suitable branches may extend from base member 402 in any order, in the illustrated example (working clockwise from the bottom left corner), the following branches are provided: Documents branch 404, Network branch 406, Print branch 408, User branch 410, Settings branch 412, Contacts branch 414, Security branch 416, Applications/Programs branch 418, Data and Files branch 420, Multimedia branch 422, and Power and Internal Management branch 424. Of course, more or fewer branches could be displayed, the order could be changed, other names could be used, and/or other data, programs, and functions could be accessed without departing from the invention.

The example user interface 400 illustrated in FIG. 2 shows another optional feature of user interfaces according to some examples of the, invention. Specifically, the example of FIG. 2 includes a branch display control interface, which, in this example, takes the form of branch display control switches ("soft switches" 430-450) associated with each branch 404-424. The branch display control interface allows the user to selectively set the branches 404-424 of the user interface 400 that will appear automatically when the user interface 400 is activated. While use of the branch display control interface and branch display control switches 430-450 will be discussed in more detail below in conjunction with FIGS. 4-6, notably, in the example illustrated in FIG. 2, switches 430-450 have been left unactivated, as evidenced by the open box depicting switches 430-450 (for comparison, an activated switch may include a "filled-in" box, e.g., with an "X," like box 432 shown in FIG. 4). Accordingly, when first activated, as shown in FIG. 2, this example user interface 400 does not completely display any of the branches 404-424.

Because the branch display control interface in the example of FIG. 2 is not configured to allow display of the full branches 404-424 upon activation of the user interface 400, only a small portion of the branch bases appears when the user interface 400 is activated, namely the small branch portions located near base member 402. There is no requirement that any portion of the branches 404-424 be shown upon activation of user interface 400. For example, only the words associated with the branches 404-424 may appear when the user interface 400 is activated. As another alternative, only the base member 402 might appear upon initially activating the user interface 400, and the branches 404-424 and/or their associated words could be made to appear through a hover action. Other initial display options are possible without departing from the invention.

FIG. 3a illustrates an example of possible changes in a user interface 400 during a hover action in some examples of user interfaces according to this invention (for simplicity and clarity, the outline of the display device 300 is not shown in FIG. 3a or the remaining figures). In this example, when activated, the user interface 400 initially appeared as shown in FIG. 2 (with no complete branches showing and none of branch display control switches 430-450 activated). Then, the user located a pointing device or indicator proximate to the Network branch 406 in a hover action (the hover location of the pointing device or indicator is signified in FIG. 3a by arrow 460). This hover action caused the complete Network branch 406 to appear, and in this example, the Network branch 406 appeared along with all of its associated sub-branches 462-484.

Changes that may occur, in at least some examples of the invention, during a hover action can be seen by comparing FIG. 3a with FIG. 3b. As shown by the movement of arrow 460, the pointing indicator has moved from the Network branch 406 to the Multimedia branch 422. This movement caused Network branch 406 to return to its original appearance (as the small base portion in this example) and Multimedia branch 422 to fully appear. In this illustrated example, Multimedia branch 422 contains numerous sub-branches 486-500, and several of these sub-branches 486-500 include further sub-branches (also called "sub-sub-branches" in this specification). An even further sub-branch structure could be provided, if feasible and desired. Also, if desired, after a hover action is completed and the pointing device is moved, the branches (and/or sub-branches) displayed as a result of the hover could remain displayed and available for any desired amount of time, rather than immediately disappearing.

While FIGS. 3a and 3b illustrate examples in which an entire branch appears, including all sub-branches and sub-sub-branches, as a result of a hover action, this result is not a requirement. For example, as illustrated in FIG. 3c, hovering a pointing device or indicator 460 over a branch (Multimedia branch 422, in this example) may cause only the branch 422 and its associated sub-branches 486-500 to appear, without the appearance of all additional associated sub-sub-branches. However, hovering over one of the sub-branches (as illustrated by the position of arrow 460 over sub-branch 498 in this example) may cause the sub-sub-branches associated with the sub-branch to appear, in this example. As another example, the individual sub-branches 486-500 also could appear as a result of a hover action. Many variations and combinations of the initial display and hover action features may be used without departing from the invention.

Figure 4:
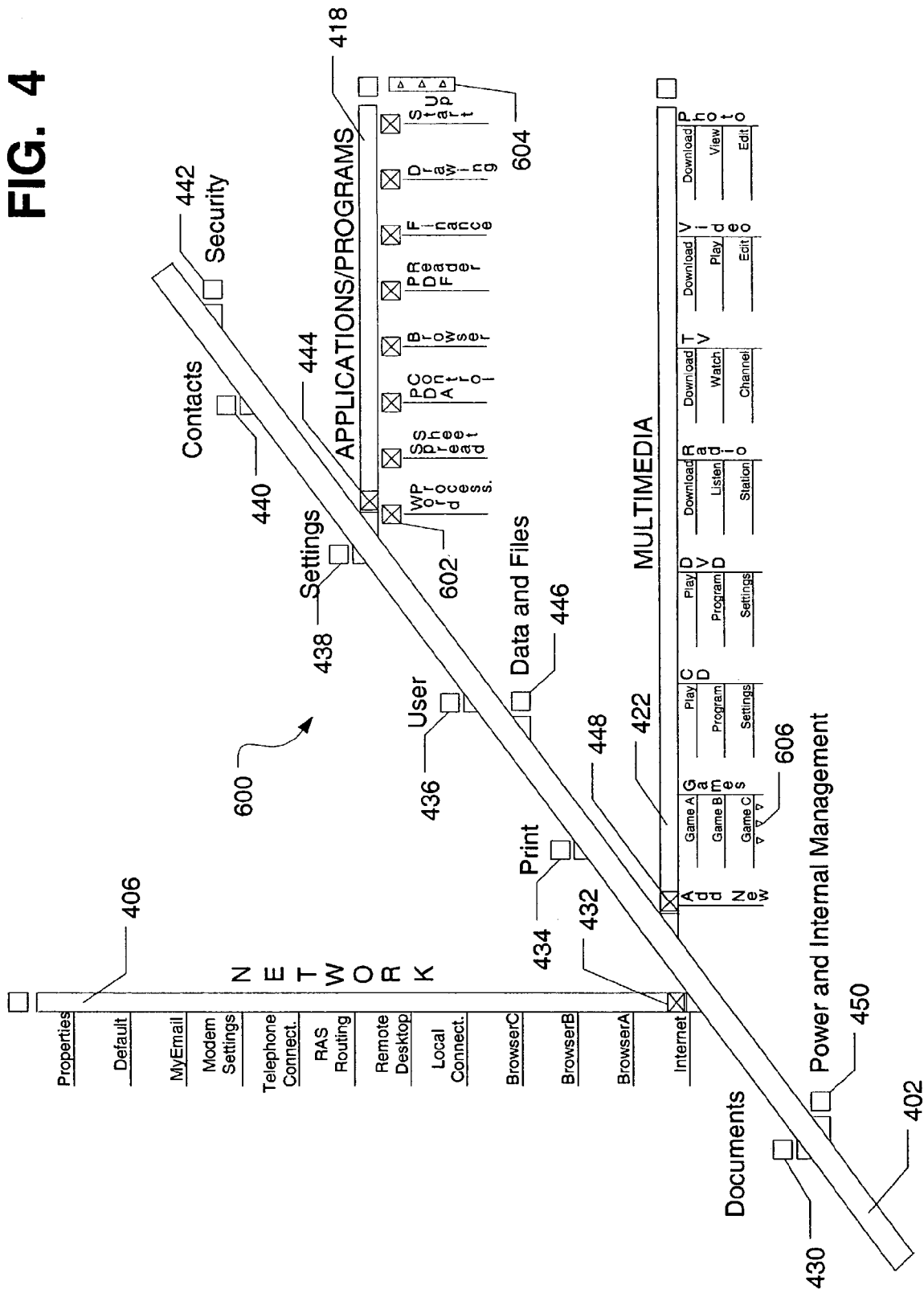

FIG. 4 illustrates examples of additional features that may be present in user interfaces according to some examples of the invention. FIG. 4 illustrates a user interface 600 as it might initially appear upon activation, e.g., using button 312 from FIG. 1. In this example, a user previously had used the branch display control interface, thereby resulting in the automatic display of Network branch 406, Applications/Programs branch 418, and Multimedia branch 422 when the user interface 600 was activated. While any suitable manner of using the branch display control interface may be provided without departing from the invention, in the illustrated example of FIG. 4, a user independently activates each specific branch that he/she wants to automatically appear. This can be accomplished, for example, by clicking (or tapping) in the branch control switches 432, 444, and 448 located proximate to the desired branches 406, 418, and 422, respectively. The "X" displayed in the branch control switches 432, 444, and 448 in FIG. 4 signifies that these switches have been activated, whereas the empty appearance of the other branch control switches (430, 434-442, 446, and 450) signifies that those branch control switches have not been activated (and hence, the full branches associated with those switches do not automatically appear upon activation of the user interface 600). In this manner, branches can be easily turned on and off in the initial display allowing the user to easily customize the initial user interface display.

Notably, while the example in FIG. 4 illustrates the entire sub-branch and sub-sub-branch structure appearing automatically when their associated branches appear, as in FIGS. 3a and 3b, this is not a requirement. Rather, if desired, in some examples of the invention, a hover action or other suitable action may be used to induce further sub-branches and/or sub-sub-branches to appear, as described above in conjunction with FIG. 3c.

The example user interface 600 shown in FIG. 4 includes another optional feature that may be present in at least some examples of the invention, namely, a sub-branch display control interface. In the illustrated example, the sub-branch display control interface includes sub-branch display switches (like switch 602) located proximate the sub-branch that they control. Because the sub-branch display control interface and the sub-branch display switches operate in similar manners to the branch display control interface and branch display switches described above, further description is not necessary.

In some instances, not all of the information desired to be included in a branch or sub-branch will fit in the available space. In such instances, expansion elements, like branch expansion element 604 and sub-branch expansion element 606 may be provided. Clicking on, tapping, hovering over, or other suitable action with respect to these expansion elements 604 and 606 may allow additional elements in the branch or sub-branch to appear. Other ways of expanding the listing of information also may be used without departing from the invention. List expansion elements of this type are conventional and known to those skilled in the art.

Figure 5:
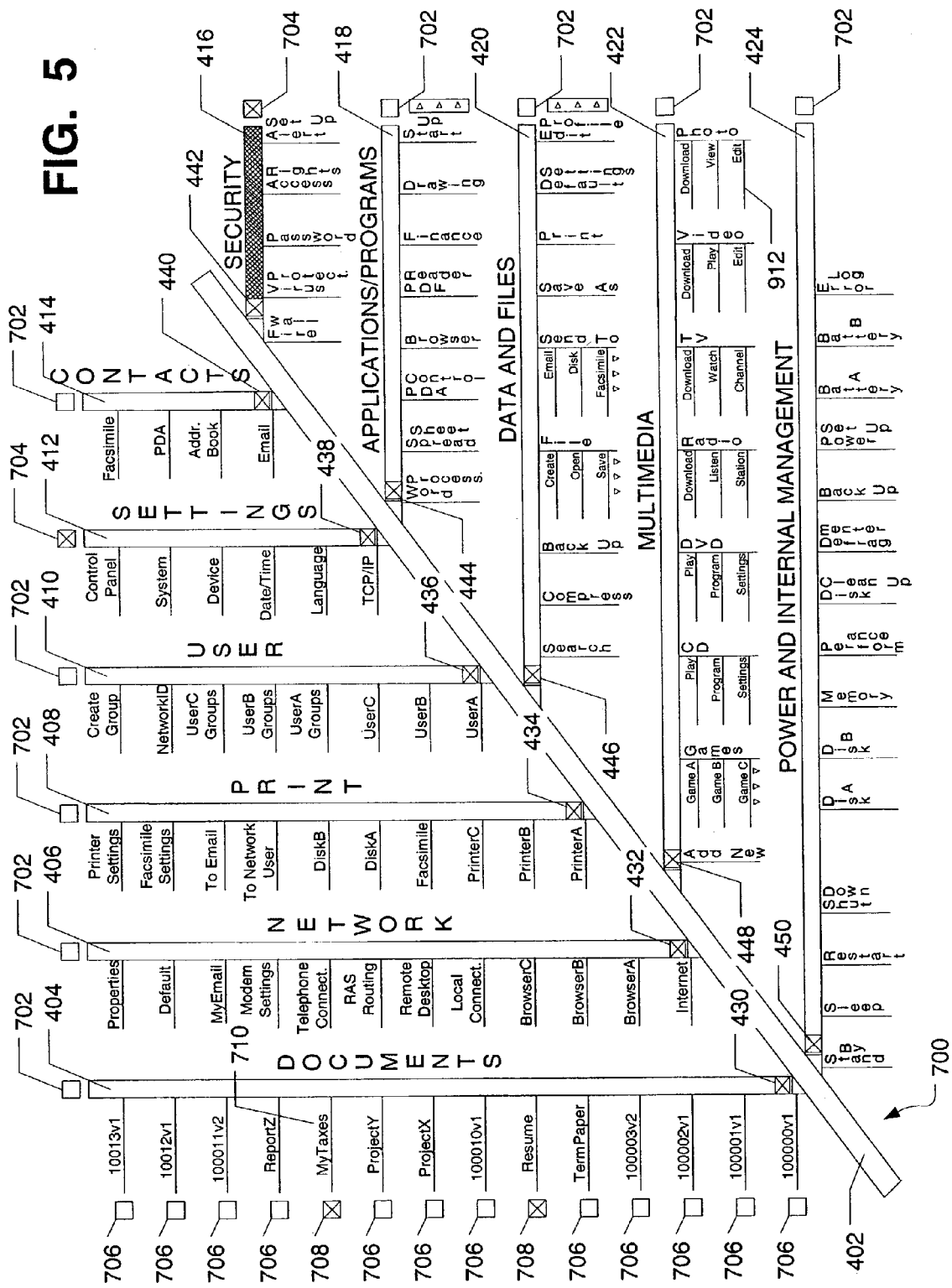

FIG. 5 illustrates another example user interface 700 as it may appear in some examples of the invention. In this example, when the user interface 700 is activated (e.g., using activation button 312 from FIG. 1), all of branches 404-424 appear because, in this example, all of the branch display switches 430-450 have been activated (as shown by "X"s in switches 430-450). While this example does not illustrate a sub-branch display control interface or switches, such elements could be included without departing from the invention.

Of course, neither the branch display control interface nor the sub-branch display control interface is necessary in all examples of the invention. Rather, these elements may be omitted, and the display could render the branches and sub-branches automatically upon activation of the user interface;

in response to user actions, such as the hover actions discussed above in conjunction with FIGS. 3a-3c; in any combination of these activation methods; or in any other suitable manner. Additionally, when present, the branch and sub-branch display control interfaces need not take the form of the switches or their specific locations as illustrated in FIGS. 2-6. Rather, the display control interfaces could be activated and/or controlled in any suitable manner without departing from the invention. For example, the display control interfaces could be activated and controlled through a menu on a tool bar present in the user interface, through a "right click" action of an input device, through an icon present in the user interface, or in any other desired or suitable manner.

The example user interface 700 of FIG. 5 illustrates additional optional features that may be present in some examples of the invention. For example, this user interface 700 includes a branch locking interface and a sub-branch locking interface. The branch locking interface in this example takes the form of one or more branch locking switches 702 and 704 located proximate to the branch that they control when the branch is fully extended. Reference number 702 relates to branch locking switches that are not activated (and do not lock the associated branch), and reference number 704 relates to branch locking switches that are activated (and lock the associated branch). Branch locking switches also were illustrated in the examples of FIGS. 3a-4, but because they were not in use, they were not discussed in connection with those figures. Similarly, the sub-branch locking interface in this example takes the form of one or more sub-branch locking switches 706 and 708 located proximate to the sub-branch that they control when the sub-branch is fully extended. Reference number 706 relates to sub-branch locking switches that are not activated (and do not lock the associated sub-branch), and reference number 708 relates to sub-branch locking switches that are activated (and lock the associated sub-branch).

Through the branch and/or sub-branch locking interfaces, a user can block unauthorized access to data, computer programs, and/or computer functions accessible through the branch and/or sub-branch. For example, if a user clicked on (or otherwise sought access to) the sub-branch 710 for "MyTaxes" (in DOCUMENTS branch 404), systems and methods according to the invention would note that the associated sub-branch lock switch 708 is activated. Then, any appropriate procedure could be followed to assure that the person seeking access to the document "My Taxes" has the right to access the data represented by sub-branch item 710. For example, systems and methods according to the invention could look at the user name of the person logged into the computer and determine whether that user has access rights to that document. If yes, it could allow access (optionally after asking for a password). As another alternative, the system could ask for a user name and/or password before allowing anyone access to a locked branch or sub-branch (e.g., for stand alone systems and/or systems that do not require user log in). Full access and use rights can be granted or more limited rights can be granted (e.g., read only, view only, etc.), in a conventional manner, without departing from the invention.

Branch lock interfaces (like branch lock switch 704 of branches 412 and 416) can work in a similar manner, except once activated, the branch lock interface in this example locks access to all data, programs, and/or functions in the branch, including all data, programs, and/or functions represented by the sub-branches and sub-sub-branches (etc.) therein. Again, any proper procedure for locking and unlocking can be used without departing from the invention, and full access and/or use rights or more limited rights can also be granted, in the conventional manner as discussed above.

Various options for implementing the locking feature may be used without departing from this invention. For example, for systems that include an "administrator" and/or use a "log in" procedure, the lock switch may be designed for use by the administrator(s) in various manners. For example, the administrator may unlock one or more branches and/or sub-branches for use by any user (represented by a white empty check box in the illustrated examples). In another example, the administrator may designate a branch and/or sub-branch as locked for some users and not others (e.g., which may be represented with a gray box having an "X" in it). In this instance, as an example, an administrator can activate the lock switch and select the users to be locked out (and/or provide other limited rights, as desired). This may be accomplished, for example, by "right clicking" on the lock switch, then selecting an item (for example "Locked Users"), and then selecting the users that should be locked out of the branch or sub-branch. Other suitable ways of locking out and selecting locked out users, may be used without departing from this invention. As another example, the administrator may lock the branch and/or sub-branch for all users (which may be represented by a darkened box and activated by a left click on the lock button, as an example). In some systems and methods according to the invention, any locks that are locked by an "administrator" must be unlocked by someone possessing administrator credentials.

Administrators, however, are not necessarily the only people that can use the lock control systems of this invention. For example, when a non-administrator is logged into the computer, the lock switch may have the various example functions described above (e.g., locked to none, locked to some, locked to all, etc.). As is conventional, a system administrator may be authorized to override an individual user's locks. If desired, administrator set locks and user set locks may appear differently on the interface so that the system user can easily determine who controls any given lock.

Like the branch display control interfaces and sub-branch display control interfaces, it is not necessary to include branch and sub-branch locking interfaces in all examples of user interfaces according to this invention. Rather, these elements may be omitted, in at least some examples, without departing from the invention. Additionally, when present, the branch and sub-branch locking interfaces need not take the form of the switches as illustrated in FIGS. 2-6. Rather, the locking interfaces could be activated and controlled in any suitable manner without departing from the invention. For example, the locking interfaces could be activated and controlled through a menu on a tool bar present in the user interface, through a "right click" action of an input device, through an icon present in the user interface, or in any other desired or suitable manner.

The examples of the user interfaces illustrated in FIGS. 2-5 show the various branches 404-424 of the user interface originating from a common base member 402. While such a structure may be used, it is not a requirement of the invention.

Figure 6:
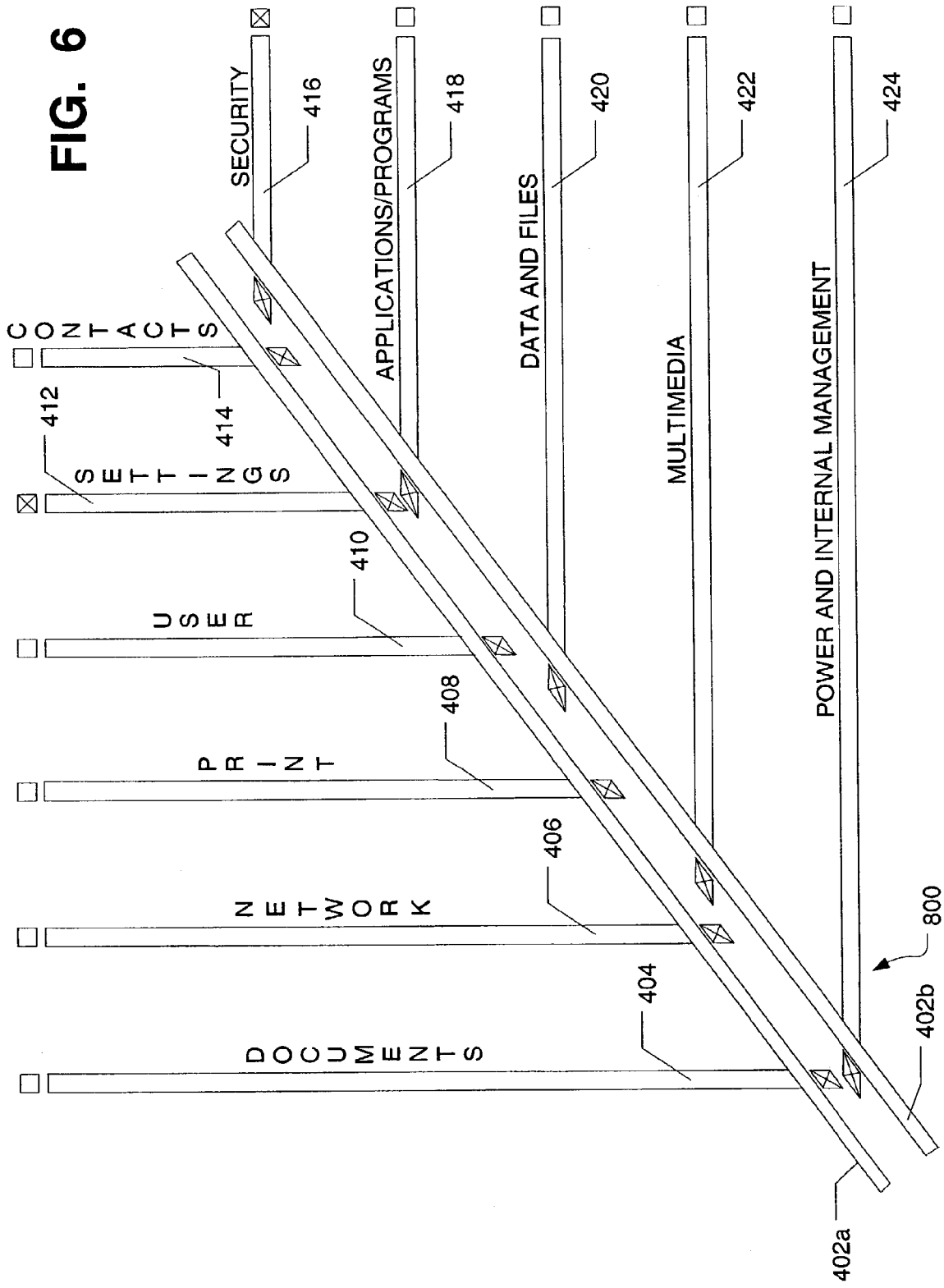

Many variations in the branched structure can be used without departing from the invention. For example, FIG. 6 illustrates an example of a user interface 800 according to the invention in which the branches 404-424 originate from two separate base members 402a and 402b. If desired (although not illustrated), base members 402a and 402b could originate from a common point or base. There is no requirement, however, for a base member at all. Rather, if desired, the various branches could originate from any locations on the display without departing from the invention and without including a visible base member 402, 402a, or 402b.

Moreover, there is no requirement that the base member(s), branches, and sub-branches be oriented in the specific manners illustrated in FIGS. 2-6. For example, rather than the diagonal arrangement, the base member(s) (if present) could be oriented horizontally, and the branches may extend vertically upward or downward and/or at another angle. As another example, the base member(s) (if present) could be oriented vertically, and the branches may extend horizontally rightward or leftward and/or at another angle. Other arrangements and/or combinations of the arrangements described above may be used without departing from the invention.

As another convenient feature that may be found in at least some examples of the invention, the user interface may provide an entry point for access to a user's contacts and contact information. This is shown in FIG. 5 by the Contacts branch 414, which provides various sub-branches relevant to the contacts present on the system.

B. Common Visual Characteristics

Another aspect of this invention relates to common visual characteristics associated with various items and/or other elements on the user interface to make it easy for users to ascertain the items and/or elements that have been grouped together. The common visual characteristic aspects of the invention may be used in combination with the branched structures described above, or they may be used independent from that branched structure.

In general, user interfaces according to this aspect of the invention will include at least two independent sections from which sets of stored data can be accessed and/or from which plural computer programs and/or other computer functions can be activated. All items of one section include a common visual characteristic associated with them in some manner (e.g., a color scheme or a common color association), while all items of another section include a different common visual characteristic associated with them in some manner (e.g., a different color association or color scheme). One "section," as described above, in at least some examples of the invention, may include one branch (including its associated sub-branches), wherein the branch and associated sub-branches include a common color scheme or, in some manner, have a common visual characteristic associated with them.

The common visual characteristic may take on many forms without departing from the invention. For example, the common visual characteristic may include a color scheme or other common color association in the section. As a more specific example, all textual information within the first section (e.g., branch and associated sub-branches) could take on one color, while all textual information in another section could take on another color. As another example, the background of one section could be rendered in one color while the background in another section could be rendered in a different color.

Returning to FIG. 5, one example of a possible use of color in the branched structure is shown. As illustrated, the background bar of the Security branch 416 is shown crosshatched in black, and all textual information in the branch and the sub-branches associated with it also are black. The background bar in the other branches 404-414 and 418-424 could then be rendered in different colors, and the textual information in the other branches and associated sub-branches could be rendered in a color to match the associated background bar color. In this manner, portions of the branch and its associated sub-branches will have a common color scheme or color associated with them.

III. EXAMPLE DATA STRUCTURES

Additional aspects of this invention relate to data structures that may be used in rendering user interfaces, for example, user interfaces like those described above. As an example, aspects of this invention include computer-readable media having stored thereon data structures used in rendering an item in a user interface, wherein the user interface depicts plural items in a branched structure having a plurality of branches of one or more grouped items. Data structures stored on computer-readable media according to some examples of the invention may include: (a) a first data field containing data representing a location of the item in the branched structure; (b) a second data field containing data representing an execution path to allow user access to data represented by the item or user activation of a computer program or a computer function represented by the item; and (c) a third data field containing data representing access rights to the data, programs, or functions represented by the item. Data structures according to some examples of the invention additionally may include a data field containing data indicating whether the item is to be displayed automatically upon activating the user interface and/or a data field containing data representing a visual characteristic to be associated with the item when it is rendered in the user interface.

As described above, at least some of the branches in the user interface may include sub-branches of one or more grouped items. In this event, the data in the first data field may include data indicating the branch and/or sub-branch in which the item is to be located.

Figure 7:
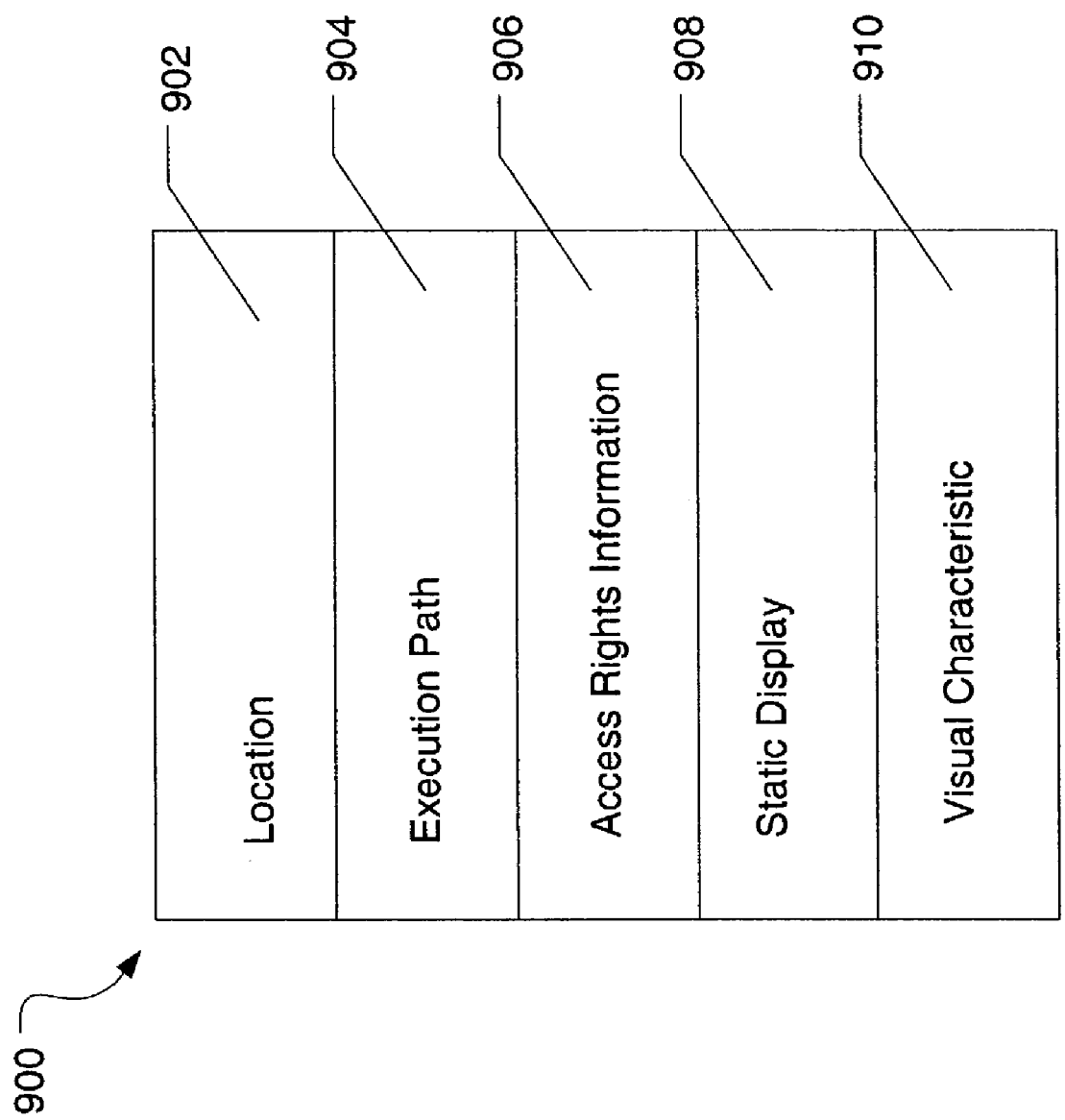
FIG. 7 illustrates an example of a data structure that may be used in some examples of this invention to render items on a user interface according to the invention.

FIG. 7 schematically illustrates an example data structure 900 that may be used in some examples of this invention in placing an item on a user interface. The first data field 902 provides information as to where the item is to be located in the interface structure (e.g., in the branched structure). In some examples of the invention, this information may constitute a list of the branches and/or sub-branches corresponding to this item. For example, item 912 in FIG. 5 represents the "Edit" sub-sub-branch of the "Photo" sub-branch of Multimedia branch 422.

Data representing this Edit item 912 in the data structure 900 may appear as follows:

ssb3.sb8.b10.base1, which means that this "Edit" item 912 appears in the user interface 700 as the third sub-sub-branch ("ssb3") of the eighth sub-branch ("sb8") of the tenth branch ("b10") (counting clockwise from the bottom left corner) on the base element ("base1"). As will be readily apparent to those skilled in the art, many alternative ways of representing this data can be used without departing from the invention. For example, the data could be provided in any order, each portion could appear in a separate array, etc. Additionally, some information may not be necessary, for example, if there is only one base member, the "base" information may be unnecessary. As still additional examples, a default value for one or more portions of the data may be assumed if no value is provided. As another possibility, the location data may provide information indicating only the immediate parent base member, branch, sub-branch, etc., and the remaining location information can be determined from this information (e.g., by looking at similar stored information for the specified parent base member, branch, or sub-branch). Many other variations in the specific structure of the data of this data field can be used without departing from the invention.

FIG. 7 further illustrates a second data field 904 for this example data structure. This data field 904 contains data representing an execution path. When the item is selected by the user (such as via a mouse click or pen tap), the system reads the execution path in data field 904. Assuming that the user is not locked out and has rights to access the data or program, the computer system will access the data and/or run the program or function represented by the item using the execution path defined in data field 904. Any conventional execution path information can be included in data field 904 without departing from the invention.

The third data field 906 illustrated in the example data structure of FIG. 7 contains data representing access rights to the data, program, or function represented by the item. The data contained in this data field 906 may vary widely. For example, it may identify individual users or groups of users that may access (or may not access) the information represented by a particular item. As another example, this data field 906 may simply identify whether the branch or sub-branch is locked or unlocked. It also may include a password or passwords that will allow access to the branch or sub-branch. Any other desired and/or suitable information may be included in data field 906 without departing from the invention.

Another possible data field included in some examples of the invention is illustrated at reference number 908 in FIG. 7. This data field 908 in this example contains data indicating whether the item is to be displayed automatically upon activating the user interface. In essence, in at least some examples of the invention, this data field 908 indicates whether the branch display control switch and/or sub-branch display control switch is activated for a given branch or sub-branch. The term "static display" means that the branch is displayed automatically upon activation of the user interface and/or that the sub-branch is automatically displayed upon display of its associated branch.

FIG. 7 illustrates a fifth data field 910. In this example, data field 910 contains data representing a visual characteristic to be associated with the item when it is rendered in the user interface. This visual characteristic may refer to any visually distinguishing feature, such as a background color, a font type, a font color, a font size, font bolding, font italicizing, font underlining, or the like. Additionally, the data field 910 could include additional information, if desired, to dictate how the branch or sub-branch or other information in the item are to appear.

Of course, it is not necessary that all of the above-noted data fields be present in data structures according to some examples of the invention. Additionally, the data fields could be located at any suitable location and/or in any desired order in the computer-readable media memory without departing from the invention.

"Computer-readable media" can be any available media that can be accessed by a user on a computer system. By way of example, and not limitation, "computer-readable media" may include computer storage media and communication media. Computer storage media includes volatile and nonvolatile, removable and non-removable media implemented in any method or technology for storage of information, such as computer readable instructions, data structures, program modules or other data. Computer storage media includes, but is not limited to, RAM, ROM, EEPROM, flash memory or other memory technology; CD-ROM, digital versatile disks (DVD) or other optical storage; magnetic cassettes, magnetic tape, magnetic disk storage or other magnetic storage devices; or any other medium which can be used to store the desired information and which can accessed by a computer. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of "computer-readable media."

IV. EXAMPLE HARDWARE

Figure 8:
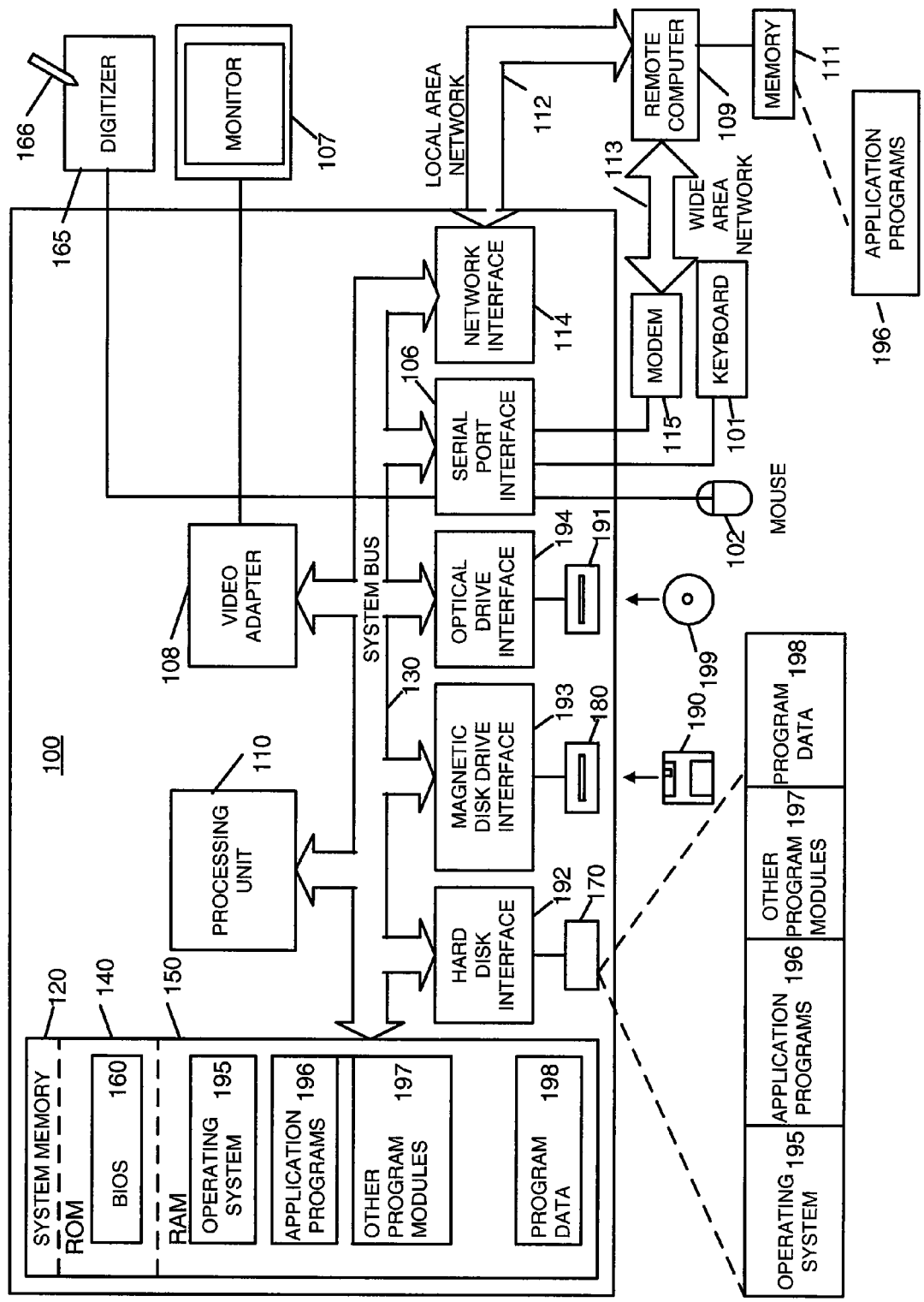
FIG. 8 illustrates a schematic diagram of a conventional general-purpose digital computing environment in which one or more examples of the present invention may be implemented.

FIG. 8 illustrates a schematic diagram of a conventional general-purpose digital computing environment that can be used to implement various aspects of the present invention. In FIG. 8, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices are often connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 8, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 8, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although only a memory storage device 111 has been illustrated in FIG. 8. The logical connections depicted in FIG. 8 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Although the FIG. 8 environment shows an exemplary environment, it will be understood that other computing environments may also be used. For example, one or more examples of the present invention may use an environment having fewer than all of the various aspects shown in FIG. 8 and described above, and these aspects may appear in various combinations and subcombinations that will be apparent to one of ordinary skill.

Figure 9:
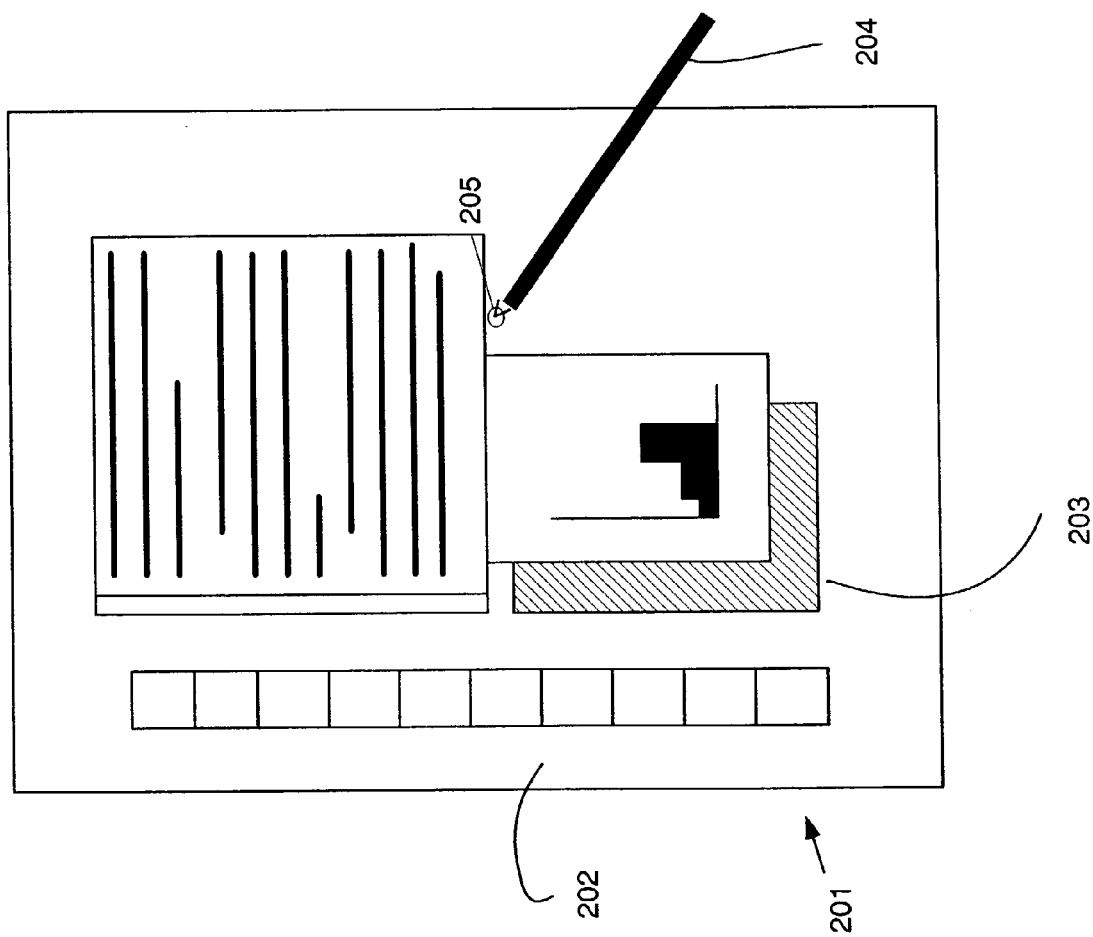
FIG. 9 illustrates a pen-based personal computing (PC) environment in which one or more examples of the present invention may be implemented.

FIG. 9 illustrates a pen-based personal computer (PC) 201 that can be used in accordance with various aspects of the present invention. Any or all of the features, subsystems, and functions in the system of FIG. 8 can be included in the computer of FIG. 9. The pen-based personal computer system 201 includes a large display surface 202, e.g., a digitizing flat panel display, preferably, a liquid crystal display (LCD) screen, on which a plurality of windows 203 is displayed.

Using stylus 204, a user can select, highlight, and write on the digitizing display area. Examples of suitable digitizing display panels include electromagnetic pen digitizers, such as pen digitizers available from Mutoh Co. or Wacom Technology Co. Other types of pen digitizers, e.g., optical digitizers, may also be used. The pen-based computing system 201 interprets gestures made using stylus 204 in order to manipulate data, enter text, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen", in which one end constitutes a writing portion and the other end constitutes an "eraser" end, and which, when moved across the display, indicates portions of electronic ink on the display that are to be erased. Other types of input devices, such as a mouse, trackball, or the like also could be used. Additionally, a user's own finger could be used for selecting or indicating portions of the displayed image on a touch-sensitive or proximity-sensitive display. Consequently, the term "user input device," as used herein, is intended to have a broad definition and encompasses many variations on well-known input devices.

V. CONCLUSION

The information to be included in user interfaces according to the invention can be determined in any suitable manner, including through input from the user. At least some portions of the user interface may be adapted to automatically include items recently used by the user and/or items frequently used by the user (e.g., a "Favorites" branch). In fact, if desired, branches or sections of the user interface could be provided dedicated to recently and/or frequently used data, programs, and/or functions. As another option, for computers used by several different users or on a network, each user could have his or her own user interface, with different access rights, and other personalizing information. The different user interfaces could be activated in any suitable manner, such as a result of a conventional user log in procedure.

Also, while the various items in certain example user interfaces described above are located in sub-branches and sub-sub-branches of the user interface, this is not a requirement. If desired, in a branched structure, one or more items could be located on a base member and/or on a branch, without departing from the invention.

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

The invention claimed is:

1. A display device having a user interface displayed thereon by a computer, wherein the user interface includes a computer desktop start menu from which plural computer programs or computer functions are activated, the user interface comprising:

a start interface, which either automatically upon activation of the user interface or in response to user action, activates said computer desktop start menu;

a first plurality of branches, wherein the first plurality of branches appear automatically upon activation of the computer desktop start menu, wherein a second plurality of the branches are displayed extending from one of said first plurality of branches in the computer desktop start menu in response to a hover action over or proximate to a branch location of one of said first plurality of branches in the computer desktop start menu and after the hover action is completed a plurality of sub-branches, wherein the sub-branches are displayed, extending from one of the second plurality of branches, wherein the sub-branches appear either automatically upon appearance of their associated branch or in response to user action, and wherein the sub-branches identify and enable activation of at least some of the computer programs or computer functions; and an interface control including a sub-branch locking interface which includes a sub-branch locking switch that controls access to or use of one sub-branch, wherein the sub-branch locking switch is located proximate to the sub-branch that it controls.

2. A display device having a user interface rendered thereon according to claim 1, wherein the interface control further includes a branch locking interface.

3. A display device having a user interface rendered thereon according to claim 2, wherein, the branch locking interface includes a branch locking switch that allows control over access to or use of all sub-branches associated with one branch.

4. A display device having a user interface rendered thereon according to claim 3, wherein the branch locking switch is located proximate to the branch that it controls.

5. A display device having a user interface rendered thereon according to claim 1, wherein the interface control further includes a branch display control interface.

6. A display device having a user interface rendered thereon according to claim 5, wherein the branch display control interface includes a branch display switch that controls whether one branch is displayed automatically upon activation of the user interface.

7. A display device having a user interface rendered thereon according to claim 6, wherein the branch display switch is located proximate to the branch that it controls.

8. A display device having a user interface rendered thereon according to claim 1, wherein the interface control further includes a sub branch display control interface.

9. A display device having a user interface rendered thereon according to claim 8, wherein the sub-branch display control interface includes a sub-branch display switch that controls whether one sub-branch is displayed automatically upon display of its associated branch.

10. A display device having a user interface rendered thereon according to claim 9, wherein the sub-branch display switch is located proximate to the sub-branch that it controls.

11. A display device having a user interface rendered thereon according to claim 1, wherein the plurality of branches includes at least a first branch and a second branch, wherein the first branch is rendered in a different color from the second branch.

12. A display device having a user interface rendered thereon according to claim 11, wherein each sub-branch associated with the first branch is rendered in the same color as the first branch and each sub-branch associated with the second branch is rendered in the same color as the second branch.

13. A display device having a user interface rendered thereon according to claim 1, wherein the rendered user interface further includes a base member, wherein at least some of the plurality of branches extend from the base member.

14. A display device having a user interface rendered thereon according to claim 1, wherein at least one of the branches or sub-branches activates a computer program or computer function that provides access to contact information stored on or accessible through the computer.

15. A method of displaying a user interface on a display device, wherein the user interface includes a computer desktop start menu from which plural computer programs or computer functions are activated, the method comprising:

using a computer, rendering a start interface, wherein the start interface either automatically upon activation of the user interface or in response to user action., activates said computer desktop start menu;

using the computer, displaying a first plurality of branches on the display device, wherein the first plurality of branches appear automatically upon activation of the computer desktop start menu, wherein a second plurality of the branches are displayed extending from one of said first plurality of branches in the computer desktop start menu in response to a hover action over or proximate to a branch location of one of said first plurality of branches in the computer desktop start menu and after the hover action is completed, the second plurality of branches displayed as a result of the hover remain displayed and available for a desired amount of time, rather than immediately disappearing;

using the computer, displaying a plurality of sub-branches on the display device, wherein the sub-branches are displayed extending from one of the second plurality of branches, wherein the sub-branches appear either automatically upon appearance of their associated branch or in response to user action, and wherein the sub-branches identify and enable activation of at least some of the computer programs or computer functions; and using the computer, displaying an interface control including a sub-branch locking interface which includes a sub-branch locking switch that controls access to or use of one sub-branch, wherein the sub-branch locking switch is located proximate to the sub-branch that it controls.

16. A method according to claim 15, wherein the interface control further includes a branch locking interface.

17. A method according to claim 16, wherein the branch locking interface includes a branch locking switch that controls access to or use of all sub-branches associated with one branch.

18. A method according to claim 15, wherein the interface control further includes a branch display control interface.

19. A method according to claim 18, wherein the branch display control interface includes a branch display switch that controls whether one branch is displayed automatically upon activation of the user interface.

20. A method according to claim 15, wherein the interface control further includes a sub-branch display control interface.

21. A method according to claim 20, wherein the sub-branch display control interface includes a sub-branch display switch that controls whether one sub-branch is displayed automatically upon display of its associated branch.

22. A method according to claim 15, wherein at least some of the sub-branches are rendered in the user interface in response to a hover action over or proximate to the sub-branch location in the user interface.

23. A method according to claim 15, wherein at least one of the branches or sub-branches activates a computer program or computer function that provides access to contact information stored on or accessible through the computer.

24. A computer-readable storage medium having computer-executable instructions stored thereon for performing a method of displaying a user interface on a display device, wherein the user interface includes a computer desktop start menu from which plural computer programs or computer functions can be activated, the method comprising:

using a computer, displaying a start interface, wherein the start interface either automatically upon activation of the user interface or in response to user action, activates said computer desktop start menu;

using the computer, displaying a first plurality of branches on the display device, wherein the first plurality of branches appear automatically upon activation of the computer desktop start menu, wherein a second plurality of the branches are displayed extending from one of said first plurality of branches in the computer desktop start menu in response to a hover action over or proximate to a branch location of one of said first plurality of branches in the computer desktop start menu and after the hover action is completed, the second plurality of branches displayed as a result of the hover remain displayed and available for a desired amount of time, rather than immediately disappearing;

using the computer, displaying a plurality of sub-branches on the display device, wherein the sub-branches are displayed extending from one of the second plurality of branches, wherein the sub-branches appear either automatically upon appearance of their associated branch or in response to user action, and wherein the sub-branches identify and enable activation of at least some of the computer programs or computer functions; and using the computer, displaying an interface control including a sub-branch locking interface which includes a sub-branch locking switch that controls access to or use of one sub-branch, wherein the sub-branch locking switch is located proximate to the sub-branch that it controls, a branch display control interface, and a sub branch display control interface.

25. A computer-readable medium according to claim 24, wherein the interface control further includes a branch locking interface.

26. A computer-readable medium according to claim 25, wherein the branch locking interface controls access to or use of all sub-branches associated with one branch.

27. A computer-readable medium according to claim 24, wherein the interface control further includes a branch display control interface.

28. A computer-readable medium according to claim 27, wherein the branch display control interface includes a branch display switch that controls whether one branch is displayed automatically upon activation of the user interface.

29. A computer-readable medium according to claim 24, wherein the interface control further includes a sub-branch display control interface.

30. A computer-readable medium according to claim 29, wherein the sub-branch display control interface includes a sub-branch display switch that controls whether one sub-branch is displayed automatically upon display of its associated branch.

* * * * *